July 19, 1966
A. L. JACKSON ETAL
3,262,040
SPEED CONTROL SYSTEM FOR CENTRIFUGE MOTORS AND THE LIKE
Filed Sept. 23, 1963
5 Sheets-Sheet 1
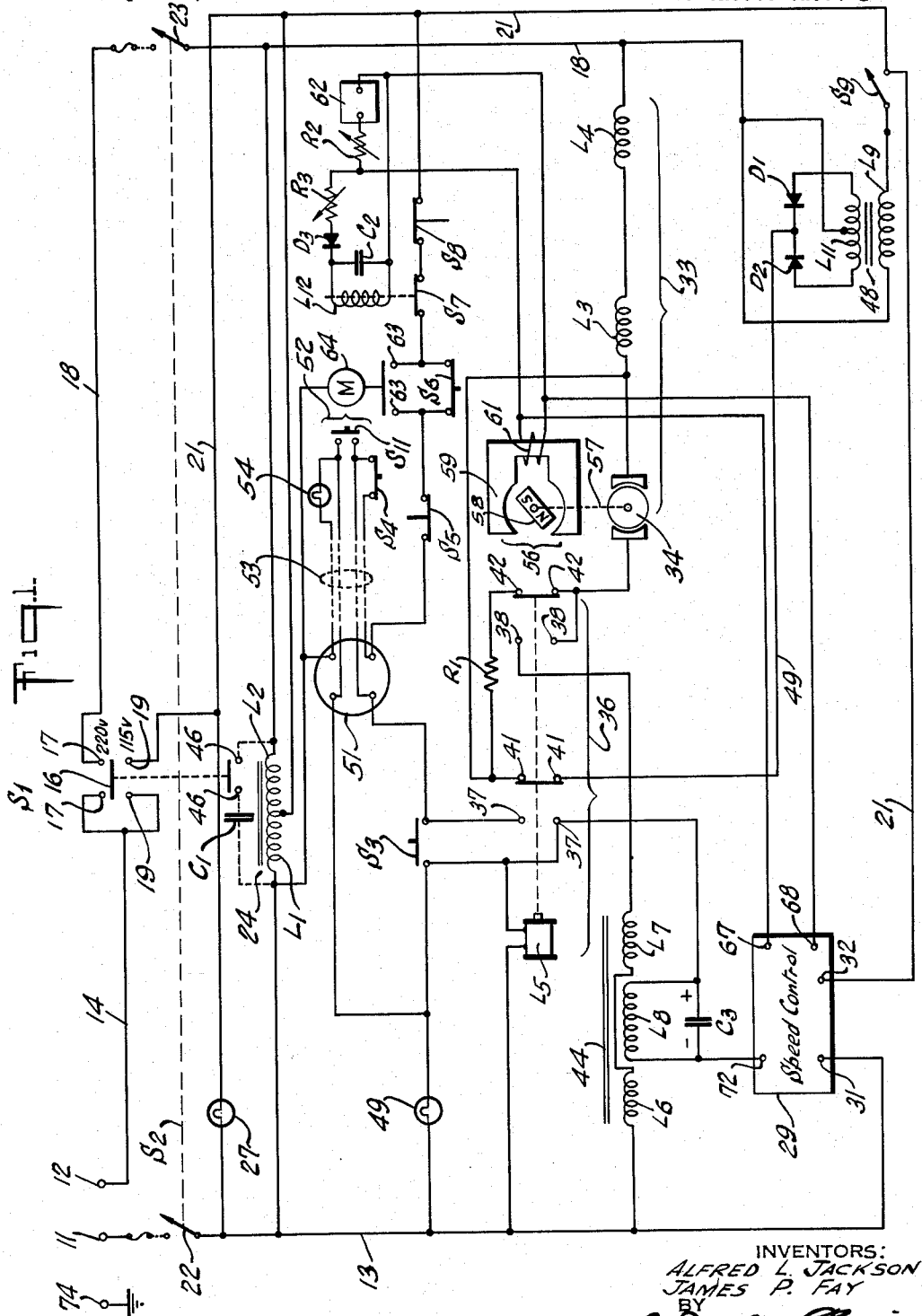
INVENTORS:
ALFRED L. JACKSON
JAMES P. FAY
BY
ATTORNEY.

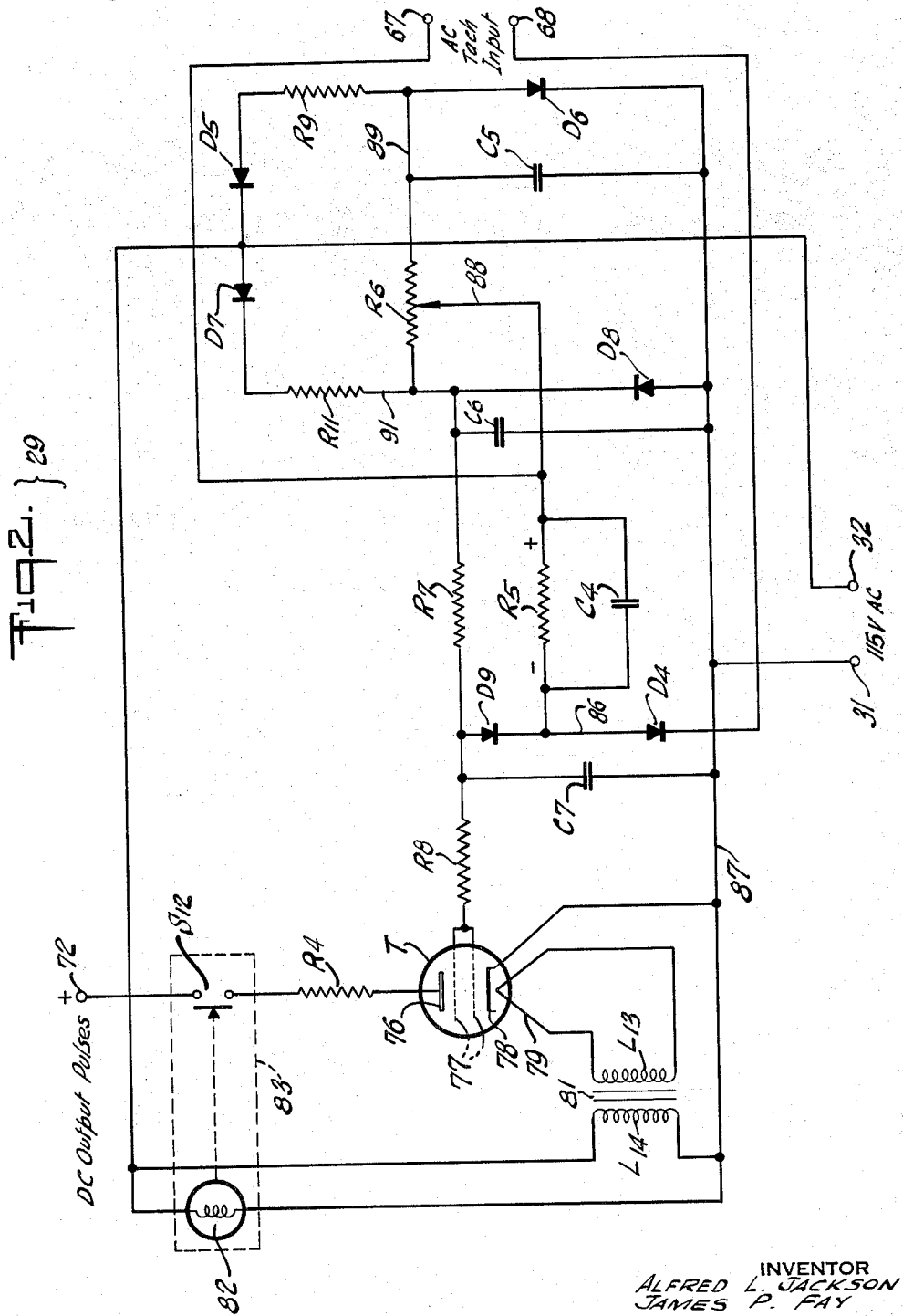

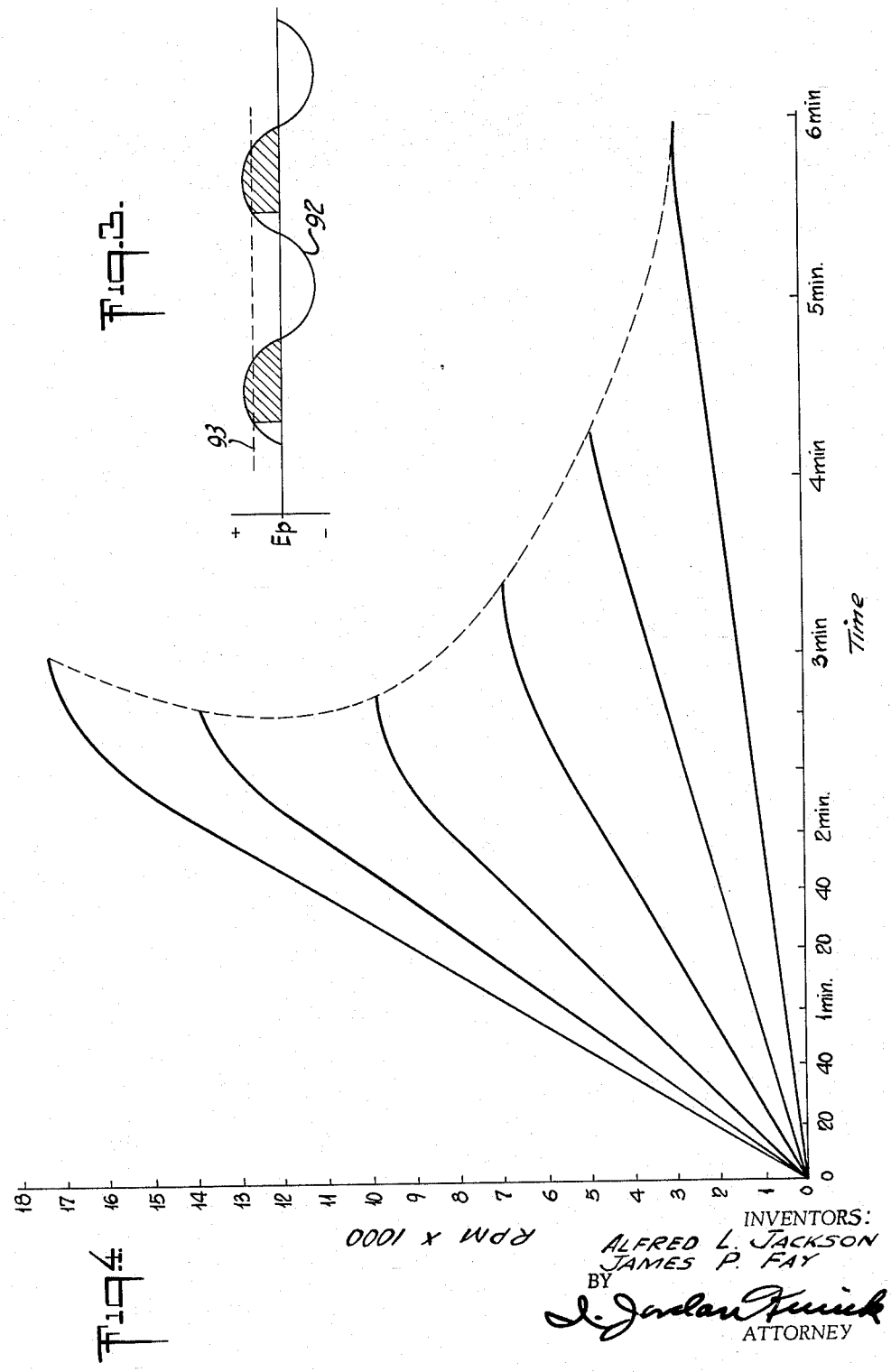

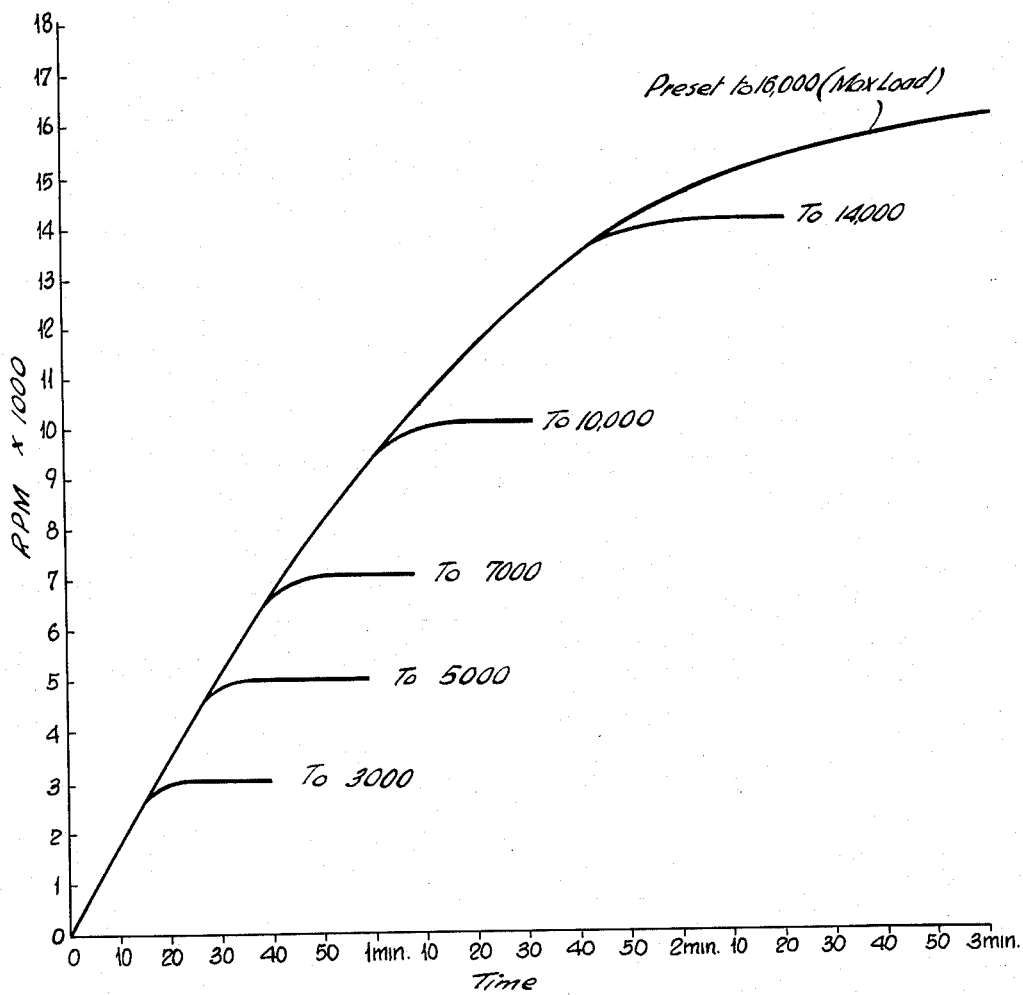

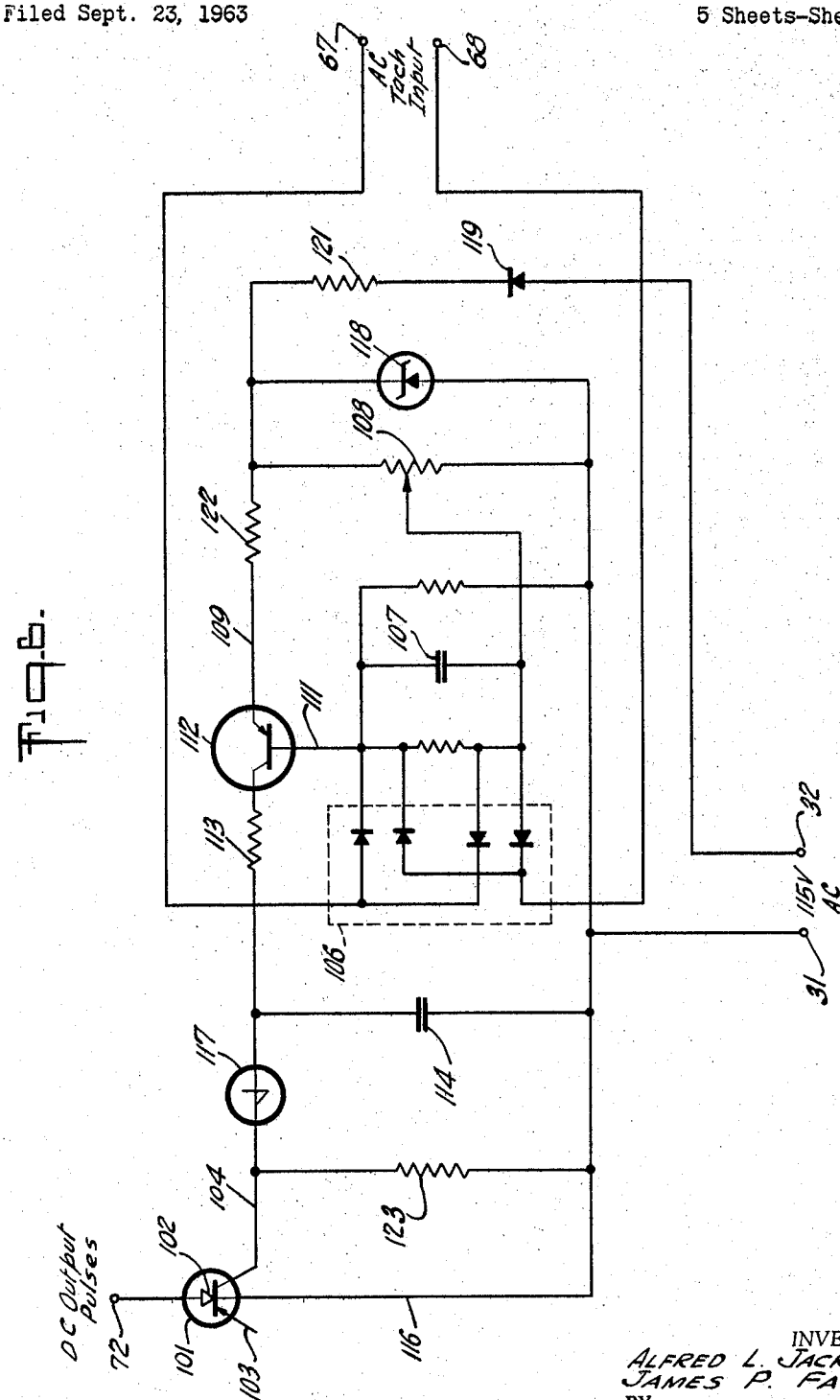

United States Patent Office 3,262,040
Patented July 19, 1966

3,262,040
SPEED CONTROL SYSTEM FOR CENTRIFUGE MOTORS AND THE LIKE
Alfred L. Jackson and James P. Fay, Norwalk, Conn., assignors to Ivan Sorvall, Inc., Norwalk, Conn., a corporation of Connecticut
Filed Sept. 23, 1963, Ser. No. 310,816
4 Claims. (Cl. 318—327)

This invention relates to an improved closed loop feedback control system for electric motors, characterized by its ability to bring the motor up to speed from rest in a minimum time.

This invention is particularly applicable to a centrifuge motor control using a universal brush type series motor whose speed may be controlled by the applied effective voltage.

In the prior art of centrifuge motor control it has been common practice to regulate the speed of such a centrifuge motor by adjusting the applied voltage by means of a variable transformer, a variable resistor, or a saturable reactor, to the value corresponding to the desired speed. That is, if a low final speed is desired, the motor is started with the low known voltage at which the motor will come to equilibrium with its back electromotive force. However, this practice leads to the undesirable result of long starting times for the motor to come up to speed, especially at lower selected speeds, since the starting torque will diminish as the desired terminal speed diminishes.

The present invention overcomes this objection, and achieves other desirable objects, by providing a system in which the maximum motor torque is applied from the start until a tachometer-generated feedback signal indicates that the motor is approaching the desired terminal speed. At this point, the tachometer error signal is made to take over control of the motor voltage by reducing the average saturation current in a controlling saturable reactor in series with the motor. This current is made proportional to the deviation of the motor speed from the selected speed. As a result, the driven centrifuge will come up to speed very rapidly at full torque, and thereafter will very accurately maintain the pre-set speed.

According to the system of the subject invention, the difference between the rectified tachometer voltage and a speed-selecting zener-diode stabilized reference voltage constitutes an error signal which controls the fraction of a cycle during which an alternating current excited controlled rectifier or thyratron will conduct. The resulting pulsating direct current is smoothed and applied as the D.C. saturation control current to a saturable reactor which limits the voltage available from the power supply line to the centrifuge motor.

Thus, when the motor is at rest, as in starting, the pre-set reference voltage dominates and biases the controlled rectifier or thyratron to fire continuously during each alternate half of the alternating current cycle. This maximum average saturation current drops the impedance of the saturable reactor to a low value so that the motor receives maximum excitation. This condition persists during a rapid starting acceleration, until the motor speed approaches the pre-set value of the reference voltage. When the rectified tachometer voltage nearly equals the reference voltage, the controlled rectifier or thyratron will begin to start firing later and later in the cycle, thereby reducing the average saturation current in the series reactor, and allowing its impedance to rise and thereby reduce the voltage applied to the centrifuge motor.

In this way a feedback control equilibrium is set up to maintain the motor running thereafter at constant speed.

The principal object of this invention is to provide a reliable motor speed control which will allow the motor to come up to speed with maximum acceleration in a minimum of time.

Another object is to provide a motor speed control which will maintain its accuracy and stability in spite of substantial variations in the power supply voltage.

Still another object is to provide a fast starting speed control module which can be easily installed in existing slow start centrifuge control systems.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings, in which:

FIGURE 1 is the schematic electrical wiring diagram of the preferred embodiment of the invention as applied to the control of a centrifuge motor;

FIG. 2 is the schematic electrical wiring diagram of the feedback control circuit embracing a thyratron indicated in the box outline forming part of FIG. 1;

FIG. 3 is a graph of the variation with time of the voltage impressed on the control thyratron included in one embodiment of the present invention, showing the delayed firing as the tachometer error signal approaches the magnitude of the pre-set reference voltage;

FIG. 4 is the graph of a family of curves showing the relation between speed and time for the starting characteristics of a conventionally controlled centrifuge motor, for different terminal speed settings;

FIG. 5 is a graph showing the speed versus time starting characteristics for a motor employing the subject invention as its control; and FIG. 6 is the schematic electrical wiring diagram of the feedback control circuit using solid state elements.

Referring to FIG. 1, numerals 11 and 12 designate the alternating current input power supply terminals. Said terminals may accommodate either high power or low power inputs, such as 220 volts or 115 volts, respectively, or the like, at 60 cycles. Connected to terminal 11 is a lead line 13 which is common to both the high power and the low power circuits to be described hereinafter. Connected to terminal 12 by way of lead 14 is a manual switch S1 whose contact element 16 may be set to close contacts 17—17 to connect the high power input to the main distribution lead line 18, to accommodate 220 volts, for example. Alternatively, switch S1 may be operated to cause control element 16 to open the circuit between contacts 17—17 and to close the circuit between contacts 19—19 to connect the input power to a low power distribution lead line 21, accommodating 115 volts, for example.

Master switch S2 has a pair of armatures 22 and 23 for simultaneously opening and closing the circutis of lines 13 and 14, respectively. A protective fuse is provided in each line 13 and 14 for performing its well known function.

With switch S2 closed and switch S1 in the 220 volt position, input current flows from terminals 11 and 12 via contacts 17—17 to the main distribution lines 13 and 18, respectively. Under these conditions, an autotransformer 24, having windings L1 and L2 will be energized from lines 13 and 18 and will deliver 115 volts A.C. to a low voltage line 21, thereby lighting pilot light 27, and energizing the speed control unit 29 at terminals 31 and 32, connected to lines 13 and 21, respectively.

The centrifuge drive motor is designated by bracket 33, and consists of series field windings L3 and L4 and the series brush commutated armature 34.

The main motor control relay is designated by bracket 36, and includes relay coil L5, normally open contacts 37—37 and 38—38, and normally closed contacts 41—41 and 42—42.

With switch S2 closed and switch S1 in the 220 volt position, as shown, motor 33 can be energized from the 220 volt lines 13 and 18 by the energization of relay 36 which closes contacts 38—38 and allows current to flow through the controlled windings L6 and L7 of saturable reactor 44.

The amount of the 220 volts across lines 13 and 18 which will be impressed on motor 33 will be determined by the voltage drop across windings L6 and L7 of reactor 44, and this in turn will be determined by the amount of saturating D.C. current being passed through the third or control winding L8 of said reactor 44.

When the D.C. current in winding L8 is large, the iron core of reactor 44 will be saturated and consequently the inductive reactance of windings L6 and L7 will be small thereby offering little impedance to the current that energizes motor 33. This condition thus represents high voltage, high torque, maximum acceleration excitation of motor 33.

Conversely, if the D.C. current in control winding L8 diminishes, the saturation in the core of reactor 44 will decrease, and the inductive impedance of windings L6 and L7 will increase, thereby lowering the exciting voltage of motor 33 whereby the latter slows down.

When the system of FIG. 1 is to be operated from 115 volts A.C., switch S1 is moved into the downward position so as to open contacts 17—17 and to close contacts 19—19 and contacts 46—46, the latter being positioned across autotransformer 24. Under these circumstances, and with master switch S2 closed, winding L1 of autotransformer 24 will be energized by 115 volts via line 21, as will pilot light 27 and speed control unit 29. Autotransformer 24 will now act to step up the 115 volts to 220 volts via winding L2 and line 18 will, as before, be supplied with 220 volts for the motor drive.

The purpose of contacts 46—46 on switch S1 is to connect a capacitor C1 across transformer 24 to improve its power factor under the heavy current conditions of 115 volt operation.

In either mode of operation of switch S1, a main motor starting switch S3 is provided. When this normally open switch is closed, current will flow from line 13 (presuming switch S2 is closed) through relay coil L5 through all the normally closed switches S4, S5, S6, S7, and S8 to reach the 115 volt distribution line 21. The consequent energization of coil L5 and normally open holding contacts 37—37 will lock-in relay 36, and continue to supply current to motor 33 via normally open contacts 38—38 which have now been closed by the action of coil L5.

In order to bring motor 33 to a rapid stop, electrical braking is provided by means of a circuit which converts the motor into a generator whose mechanical kinetic energy of rotation is converted into heat in a resistor. This is accomplished by continuing to maintain the magnetic flux by energizing field coils L3 and L4 from a separate D.C. power supply, while connecting the armature brushes to a heat dissipating load resistor R1.

The foregoing separate braking power supply comprises brake switch S9 connecting line 21 to step-down transformer 48 having a primary winding L9 and a center tapped secondary winding L11, the ends of which are connected to full wave diode rectifiers D1 and D2, respectively. Rectifiers D1 and D2 are connected to relay contact 41 by way of lead line 49.

This low voltage D.C. current supply is impressed across motor field coils L3 and L4 when switches S2, S9 and contacts 41—41 are closed due to the dropping out of relay 36 into its unenergized position. The deenergizing of relay 36 also closes contacts 42—42 which connect braking load resistor R1 across armature 34. A pilot light 49 is provided across coil L5 to indicate when relay 36 is energized.

The series of normally closed switches S4, S5, S6, S7, and S8 are provided as safety and limit switches, the opening of any one of which deenergizes relay 36 and brake the motor to a stop, providing switch S9 is closed. S4 is a manual remote control switch, S5 is the master stop switch, S6 is a manually programmable time delay stop switch, S7 is an overspeed switch operated by relay coil L12, and S8 is an unbalance switch operated in response to excessive vibration of the centrifuge motor 33.

Numeral 51 represents a separable plug for connecting the remote control unit 52 to the control system by cable 53.

Within remote control unit 52 are normally closed switch S4, whose opening will cause stopping of the centrifuge, normally open switch S11 whose closing will perform the same parallel starting function as switch S3, and the remote indicating pilot light 54 which echoes pilot light 49.

To prevent the spinning of motor 33 beyond a predetermined limit of rotational velocity, and to provide a reference error signal as to the actual rotational velocity of the centrifuge driven by said motor, a generating A.C. tachometer-generator 56 is provided, angularly connected to armature 34 by coupling 57. The output of this tachometer-generator is applied to two control systems; namely, speed limit cut out, and speed control.

Tachometer-generator 56 comprises the permanently magnetized rotor 58 coupled to motor armature 34, a permeable magnetic circuit 59, and a tachometer field winding 61. In some embodiments, it is evident that two separate tachometer-generators, such as 56, may be used to obviate interaction between the speed and overspeed control of motor 33.

Field winding 61 is connected by suitable leads to the overspeed system which comprises the speed indicating voltmeter 62 with its calibrating variable resistor R2, together with the parallel rectifier circuit including variable resistor R3, rectifier D3, and smoothing capacitor C2. The output of rectifier D3 is applied to overspeed relay coil L12, so that at a predetermined overspeed velocity, coil L12, will open the contacts of switch S7, thereby deenergizing relay 36 and stopping motor 33.

Indicating meter 62 is adjusted to a calibrated reading of the rotational rate of centrifuge motor 33 by means of variable resistor R2. Variable resistor R3 is adjusted to the predetermined revolutions per minute of motor 33 at which tachometer-generator 56 trips overvelocity relay coil L12 to open the contacts of stop switch S7.

Provision is made for automatic time programming of centrifugation by the closing and opening of contacts 63—63 of control clock 64 energized by autotransformer winding L1.

The output voltage from coil 61 of tachometer-generator 56 is also impressed on the feedback signal terminals 67 and 68 of speed control unit 29.

The output of control unit 29 consists of D.C. pulses appearing at terminal 72. These pulses are smoothed and integrated by capacitor C3 before being impressed on control winding L8 of saturable reactor 44. The alternating current voltage from which control winding L8 is energized under control of unit 29 is delivered from closed relay contacts 37—37. Consequently, the deenergization of relay 36 also deenergizes control winding L8.

Terminal 74 represents the ground lead of the entire system.

Referring now to FIG. 2, which is the schematic wiring diagram of speed control unit 29, this circuit includes a thermionic thyratron T which is a grid controlled gas discharge tube having a plate 76, two control grids 77—77, a cathode 78, and a heater filament 79.

Filament 79 is energized by the secondary winding L13 of transformer 81. The primary winding L14 of transformer 81 is connected across the input A.C. line terminals 31 and 32, as is the thermal time delay relay heater 82. Delay relay 83 controls normally open switch S12 which intervenes between terminal 72 and plate 76 of thyratron T, so that a predetermined time interval must intervene between the energization of terminals 31 and 32 and the application of plate voltage to thyratron T from terminal 72 by the closing of switch S12. This delay allows cathode 78 of tube T to come up to emission temperature so that premature potential gradients will not damage it. The control grids 77—77 of thyratron tube T are tied together. Resistor R4 in the plate lead of thyratron T is provided to protect the tube from excessive currents.

The A.C. tachometer voltage from generator 56, impressed upon terminals 67 and 68 of speed control 29, is rectified by half wave diode D4 so as to charge smoothing capacitor C4 to a voltage dependent upon the speed of motor 33. This voltage is applied across load resistor R5 so that the potential of rectifier lead line 86 relative to the cathode lead line 87 will be the algebraic sum of the reference potential on lead line 88 selected by the speed control resistor R6 and the rectified tachometer potential appearing across load resistor R5. The potential on lead line 86 is thus the error signal of a closed feedback system.

The grids 77—77 of thyratron T are normally held to a positive potential by their connection through the high valued resistor R7. However, since grids 77—77 draw current when T is conducting or "firing," this potential will not be more than a few volts above cathode potential. A resistor R8 is provided to limit this grid current.

The reference voltage made available on lead line 88 connected to the wiper arm of speed control potentiometer R6 is made adjustable from approximately minus 6 volts to plus 47 volts relative to cathode lead line 87.

The minus 6 volts is supplied on lead line 89 by half wave diode D5 which rectifies the line voltage across input terminals 31, 32, and passes it through dropping resistor R9 to smoothing capacitor C5. A 6 volt zener diode D6 then clamps lead line 89 to the specified minus 6 volts regardless of line voltage variations within wide limits.

Similarly, the plus 47 volts is supplied on lead line 91 by half wave diode D7 which rectifies the line voltage of terminals 31, 32, and passes it through dropping resistor R11 to smoothing capacitor C6. A 47 volt zener diode D8 then clamps lead line 91 to the specified plus 47 volts potential, again in spite of line voltage fluctuation.

When the potential of lead line 86 becomes negative due to the dominance of the tachometer signal over the speed control setting of R6, diode D9 conducts and overcomes the positive bias supplied through resistor R7 due to the lower impedance of resistors R5 and R6. As a result, grids 77—77 are forced to a negative potential, thereby requiring a progressively higher positive plate voltage before thyratron T will fire as the potential of lead line 86 becomes progressively more negative. Capacitor C7 serves as an integrator to smooth the transfer function of the feedback loop.

The independent function of speed control resistor or potentiometer R6 derives from the fact that zener diode D6 controls the voltage at one end of said resistor and zener diode D8 controls the voltage at the other end of said resistor. Regardless of the input voltage, the speed setting for the motor 33 is effective because the source of the control stems from the tachometer-generator operating in combination with the stabilized D.C. reference voltage as controlled by control resistor R6.

FIG. 3 diagrammatically illustrates the foregoing negative biasing action. Numeral 92 designates the alternating potential applied to plate 76 of thyratron T at terminal 72. The shaded portions of the graph represent the conductive periods of thyratron T. It may be seen that conduction starts only when the plate potential rises to a level, designated 93, for a given amount of negative bias on grids 77—77. As this level rises the amount of conduction, and therefore the total average control current delivered to saturable reactor 44, diminishes until, at approximately minus 4 volts for one typical thyratron, the tube cuts off entirely and no conduction takes place.

It is evident that the speed at which this modulation of the motor drive voltage takes place will be dependent upon the setting of the speed control potentiometer R6 since this reference potential is electrically opposing the rectified tachometer potential.

Until the motor speed closely approaches the desired speed set on potentiometer R6, the positive bias supplied by resistor R7 will keep thyratron T in full conduction, thereby minimizing the impedance of reactor 44 and allowing the motor to accelerate at its maximum rate.

FIG. 4 shows the family of acceleration curves which result in a typical prior art device where a fixed pre-set current is applied to the control winding L8 of saturable reactor 44. While preselected centrifuge speeds of 10,000 r.p.m. are reached in approximately three minutes, lower speeds are reached in increasingly longer periods of time. A preselected speed of 3,000 r.p.m., for example, is not reached until approximately six minutes has elapsed. An excessively long time is required for motor 33 to achieve the desired speed as set in advance by the choice of fixed current excitation for control winding L8. This is due to the fact that with conventional centrifuging control, low speeds are associated with low acceleration.

The graph of FIG. 5 shows the improved performance provided by the present invention. Here, regardless of the selected terminal speed, motor 33 proceeds at maximum acceleration until the modulating action shown in FIG. 3 comes into play, thereby giving rise to the rounded knee of each speed curve as it approaches its constant speed plateau. The illustrated times to reach each plateau demonstrate the resultant saving in operational time.

The operation of this invention is as follows:

With switch S1 in the appropriate position, master switch S2 is closed. Closure of switch S2 energizes terminals 31, 32 of speed control unit 29 and starts delay relay 82 to heat up and to close switch S12. At this time either the operation of switch S3 or S11 will lock relay 36 into its energized position. Closure of contacts 38—38 on relay 36 then energizes motor 33 from busses 13 and 18 through reactor 44. Initially, due to the absence of voltage from tachometer-generator 56 at terminals 67–68 of control unit 29, tube T will be in full conduction, and the impedance of reactor 44 will be at a minimum. Under these circumstances motor 33 will increase speed at maximum acceleration until the rectified tachometer voltage across resistor R5 will approach equality with the potential selected by potentiometer R6. At this point the closed feedback loop including motor 33, tachometer-generator 56, control unit 29, and reactor 44 will begin to modulate downward the current supplied to reactor 44, thereby increasing its impedance and limiting the motor velocity to the preselected value.

With brake switch S9 closed, the manual operation of either stop buttons S4 or S5, or the automatic opening of any one of switches S6, S7, S8 or the opening of contacts 63—63 when manual switch S6 is open, will drop out relay 36. The de-energization of relay 36 will remove power from motor 33, and by the closure of contacts 41—41 and 42—42, convert motor 33 into a generator, thus dissipating its mechanical energy in the heating of load resistor R1 so as to brake motor 33 rapidly to a stop.

In another and sometimes preferred embodiment of the present invention, the circuit shown in FIG. 2 may be replaced by the solid state feedback control circuit shown in FIG. 6. Tube T is replaced by a silicon controlled rectifier 101 having an anode 102, a cathode 103 and a gate connected to line 104. Anode 102 is connected to terminal 72. The A.C. tachometer voltage from generator 56 impressed on terminals 67 and 68 of the speed control unit 29 is rectified by the full-wave rectifier assembly 106 connected across said terminals so as to charge smoothing capacitor 107 to a voltage dependent on the speed of motor 33.

This voltage is algebraically added to the reference potential as determined by the setting of variable speed control resistor 108 relative to lead line 109, the movable contact of said resistor being connected to one side of rectifier 106. The potential on lead line 111, connected to the other side of said rectifier is consequently the error signal of a closed feedback system. Transistor 112 has its base connected to line 111, its emitter connected to line 109 and its collector connected to line 104. Transistor 112 amplifies the error signal and thus switches a larger current on and off to control the gate of the less sensitive silicon controlled rectifier 101. The gate connection is normally held at cathode potential by means of resistor 123 connected between leads 104 and 116 whereby rectifier 101 is normally maintained in a non-conducting condition.

In response to an error signal on line 111, transistor 112 will conduct and deliver a positive pulse at its collector terminal, said pulse being limited in value by resistor 113 and delivered to capacitor 114 connected across line 104 and line 116, the latter being connected to cathode 103 of rectifier 101. Capacitor 114 will charge up to a voltage determined by breakdown or avalanche diode 117 in line 104 and thus trigger the gate of silicon controlled rectifier 101 whereby the latter is in a conducting condition for the rest of the cycle.

The reference voltage made available at the movable contact of variable resistor 108 is adjustable from zero potential to the voltage determined by the rating of zener diode 118 connected across said resistor and which is fed by the 115 volt A.C. line from terminal 32 through half-wave rectifier diode 119 and voltage dropping resistor 121. By this means the zener diode rated voltage is maintained at the input of the speed control potentiometer 108 in spite of wide line voltage fluctuations.

As the motor speed closely approaches the desired speed set on potentiometer 108, the rectified tachometer voltage will lessen the input signal at line 111, and in combination with the voltage drop through input resistor 122 of transistor 112, will create a modulating effect upon the output of said transistor. This modulation is reflected in an increase in the length of time it takes to charge capacitor 114 to the point of breakdown of the avalanche diode 117.

As the motor speed approaches the preselected point the triggering threshold of the silicon controlled rectifier 101 thus occurs later and later in the cycle until a point of equilibrium is reached at the preselected motor speed.

The advantage realized by utilizing solid state elements in the speed control circuit, as exemplified in FIG. 6, resides in the fact that such elements do not require a warm-up period to attain satisfactory operating conditions and for the same capacity they combine greater reliability with smaller space requirements than similar electronic tube equipment.

It is claimed:

1. A motor control system comprising a series brush commutated motor, a saturable reactor having a saturation control winding, a first source of alternating current, means to impress said first source of alternating current on said motor and said reactor in series relation, a speed sensing alternating voltage generator coupled to said motor, rectifying means to convert the output of said generator into a direct potential approximately proportional to the speed of said motor, an adjustable source of direct current speed controlling reference potential, a grid controlled gas discharge tube having a plate, a grid, and a cathode, a second source of alternating current, first circuit means connecting said gas discharge tube, said reactor control winding and said second alternating current source in series relation, and second circuit means for applying a potential which is a function of the difference between said speed proportional potential and said reference potential to the control grid of said grid controlled gas discharge tube, said adjustable reference potential source including a first zener diode to maintain a first positive reference potential with respect to said cathode, a second zener diode to maintain a second negative reference potential with respect to said cathode, and potentiometer means to select an intermediate potential between said first positive and second negative zener reference potentials.

2. In a system according to claim 1, a capacitor connected across said control winding.

3. In a system according to claim 1, means to maintain the grid of said gas discharge tube at a positive potential with respect to said cathode until said difference potential is negative with respect to said cathode.

4. A motor control system comprising a motor, a saturable reactor having a saturation control winding, a first source of alternating current, means to impress said first source of current on said motor and said reactor in series relation, a speed sensing voltage generator coupled to said motor, means converting the output of said generator into a direct potential approximately proportional to the speed of said motor, an adjustable source of direct current speed controlling reference potential, a controlled rectifier having an anode, a cathode and a gate, a second source of alternating current, first circuit means connecting said controlled rectifier, said reactor control winding and said second alternating current source in series relation, and second circuit means for applying a potential which is a function of the difference between said speed proportional potential and said reference potential to the cathode of said controlled rectifier, said adjustable reference potential source including a first zener diode to maintain a first positive reference potential with respect to said cathode, a second zener diode to maintain a second negative reference potential with respect to said cathode, and potentiometer means to select an intermediate potential between said first positive and second negative zener reference potentials.

References Cited by the Examiner

UNITED STATES PATENTS

| 2,722,646 | 11/1955 | Rhyne _____ 318—327 X |
| 2,825,861 | 3/1958 | Weinstein _____ 318—327 |
| 2,894,191 | 7/1959 | Charbonneaux ____ 318—327 X |
| 3,026,463 | 3/1962 | Wolke et al. _____ 318—327 |
| 3,123,757 | 3/1964 | Gaudet _____ 318—327 |
| 3,170,104 | 2/1965 | Richards et al. ____ 318—327 X |

ORIS L. RADER, *Primary Examiner.*

S. GORDON, J. C. BERENZWEIG, *Assistant Examiners.*